(12) United States Patent
Lei

(10) Patent No.: US 11,483,096 B2
(45) Date of Patent: Oct. 25, 2022

(54) METHOD AND APPARATUS FOR HARQ-ACK CODEBOOK DETERMINATION

(71) Applicant: Lenovo (Beijing) Limited, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 138 days.

(21) Appl. No.: 16/764,669

(22) PCT Filed: Nov. 16, 2017

(86) PCT No.: PCT/CN2017/111352
§ 371 (c)(1),
(2) Date: May 15, 2020

(87) PCT Pub. No.: WO2019/095202
PCT Pub. Date: May 23, 2019

(65) Prior Publication Data
US 2021/0176011 A1 Jun. 10, 2021

(51) Int. Cl.
*H04L 1/18* (2006.01)
*H04W 72/04* (2009.01)

(52) U.S. Cl.
CPC .......... *H04L 1/1812* (2013.01); *H04L 1/1864* (2013.01); *H04L 1/1896* (2013.01); *H04W 72/042* (2013.01)

(58) Field of Classification Search
CPC ... H04W 28/04; H04W 72/04; H04W 72/042; H04W 88/08; H04L 5/0007; H04L 1/1812; H04L 1/1896; H04L 1/1864
(Continued)

(56) References Cited

U.S. PATENT DOCUMENTS

| 9,954,647 | B2 * | 4/2018 | Chang | .................. H04L 27/265 |
| 2011/0080975 | A1 | 4/2011 | Toda et al. | |

(Continued)

FOREIGN PATENT DOCUMENTS

CN 105530072 A * 4/2016 ............... H04L 1/00

OTHER PUBLICATIONS

3GPP TSG RAN WG1 Meeting 90bis, Prague, CZ, Oct. 9-13, 2017, R1-1718622, Agenda Item: 7.3.3.3, Source: Nokia, Nokia Shanghai Bell, Title: On CBG based transmissions. (Year: 2017).*

(Continued)

*Primary Examiner* — Peter G Solinsky
*Assistant Examiner* — Sanjay K Dewan
(74) *Attorney, Agent, or Firm* — Kunzler Bean & Adamson (57) ABSTRACT

The present application is related to a method and apparatus for HARQ-ACK codebook determination. A method of receiving information according to one embodiment comprises receiving, from a base unit, a first signal for indicating a first parameter which is a quantity of transport blocks (TBs) in a downlink association set and receiving a second signal for indicating a second parameter which is a quantity of hybrid automatic repeat request acknowledgement (HARQ-ACK) bit fields in a HARQ-ACK codebook, determining a size of the HARQ-ACK codebook based on the first signal and the second signal, and transmitting the HARQ-ACK codebook to the base unit, wherein the HARQ-ACK codebook comprises a first part including K1 HARQ-ACK bits and a second part including K2 HARQ-ACK bit fields, wherein each bit in the first part corresponds to one TB in the downlink association set; and each HARQ-ACK bit field in the second part corresponds to one incorrectly decoded TB in the downlink association set. The present application reduces signaling overhead for a HARQ-ACK (Continued)

codebook and avoids misunderstanding between a base unit and a remote unit when determining a HARQ-ACK codebook.

19 Claims, 8 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2015/0036604 | A1* | 2/2015 | Park | H04L 5/0037 370/329 |
| 2015/0200751 | A1* | 7/2015 | Yin | H04L 5/001 370/280 |
| 2016/0029322 | A1* | 1/2016 | Cozzo | H04W 52/248 370/329 |
| 2019/0045489 | A1* | 2/2019 | He | H04W 72/12 |
| 2019/0140767 | A1* | 5/2019 | Chen | H04L 1/0057 |
| 2019/0149173 | A1* | 5/2019 | Chen | H03M 13/13 714/758 |
| 2021/0006377 | A1* | 1/2021 | Hooli | H04L 1/1864 |
| 2021/0153185 | A1* | 5/2021 | Schober | H04L 5/0051 |
| 2021/0167900 | A1* | 6/2021 | Karaki | H04L 1/1854 |

OTHER PUBLICATIONS

3GPP TSG RAN WG1 Meeting NR#3, Nagoya, Japan, Sep. 18-21, 2017, R1-1716257, Agenda Item: 6.3.3.3, Source: InterDigital, Inc., Title: CBG-based (re)-transmission. (Year: 2017).*

3GPP TSG RAN WG1 Meeting #90bis, Prague, Czech Republic, Oct. 9-13, 2017, R1-1718645, Agenda Item: 7.3.3.2, Source: Ericsson, Title: On HARQ Management. (Year: 2017).*

3GPP TSG-RAN WG1 NR AH #3, Nagoya, Japan, Sep. 18-21, 2017, R1-1715547, Agenda Item: 6.3.3.3, Source: Nokia, Nokia Shanghai Bell, Title: On CBG based transmissions. (Year: 2017).*

Ericsson, On HARQ Management, 3GPP TSG RAN1 WG1 Meeting #90bis, R1-1718645, Oct. 9-13, 2017, pp. 1-10, Prague, Czech Republic.

Samsung, Summary on CA Aspects, 3GPP TSG RAN WG1#90bis, R1-1718781, Oct. 9-13, 2017, pp. 1-10, Prague, Czech Republic.

Nokia, et al., On CBG based transmissions, 3GPP TSG-RAN WG1 NR AH #3, R1-1715547, Sep. 18-21, 2017, pp. 1-7, Nagoya, Japan.

InterDigital, Inc., CBG-based (re)-transmission, R1-1716257, 3GPP TSG RAN WG1 Meeting NR#3, Sep. 18-21, 2017, pp. 1-5.

Nokia, Nokia Shanghai Bell, On CBG based transmissions, R1-1718622, 3GPP TSG RAN WG1 Meeting 90bis, Oct. 9-13, 2017, pp. 1-8.

PCT/CN2017/111352, "International Search Report and the Written Opinion of the International Search Authority" ISA/CN, State Intellectual Property Office of the P.R. China, Jul. 19, 2018, pp. 1-6.

* cited by examiner

METHOD AND APPARATUS FOR HARQ-ACK CODEBOOK DETERMINATION

TECHNICAL FIELD

The present application generally relates to technology about hybrid automatic repeat request-acknowledgement (HARQ-ACK) feedback, and more specifically to technology about HARQ-ACK codebook determination for multiple transmission resources between a base unit and a remote unit.

BACKGROUND OF THE INVENTION

In wireless communication technology, HARQ-ACK feedback technology is commonly used during data transmission, so as to feedback whether data was correctly received in the downlink (DL) or uplink (UL) transmission. HARQ-ACK represents collectively the Positive Acknowledgement (ACK) and the Negative Acknowledgement (NACK). ACK means data was correctly received while NACK means data was erroneously received. For HARQ-ACK feedback information (which may be called a HARQ-ACK codebook, for example), the HARQ-ACK codebook size is usually preconfigured and/or determined during transmission. However, in some cases, when a HARQ-ACK codebook consists of HARQ-ACK bits corresponding to multiple DL or UL resources in time domain and/or carrier domain, issues on the HARQ-ACK codebook determination, especially the size of the HARQ-ACK codebook need to be solved, to avoid any misunderstanding between a base unit and a remote unit during data transmission.

Thus, a manner of determining a HARQ-ACK codebook used for multiple DL or UL resources in time domain and/or carrier domain is desirable.

BRIEF SUMMARY OF THE INVENTION

One objective of the present application is to provide a manner of determining a HARQ-ACK codebook used for multiple DL or UL resources in time domain and/or carrier domain.

One embodiment of the present application provides a method. The method includes receiving a first signal for indicating a parameter of K1, receiving a second signal for indicating a parameter of K2, determining a size of a hybrid automatic repeat request acknowledgement (HARQ-ACK) codebook based on the first signal and the second signal, and transmitting the HARQ-ACK codebook. Wherein K1 is a quantity of transport blocks (TBs) in a downlink association set, and K2 is a quantity of HARQ-ACK bit fields in the HARQ-ACK codebook. The HARQ-ACK codebook includes a first part including K1 HARQ-ACK bits and a second part including K2 HARQ-ACK bit fields, wherein each bit in the first part corresponds to one TB in the downlink association set, and each HARQ-ACK bit field in the second part corresponds to one incorrectly decoded TB in the downlink association set.

Another embodiment of the present application also provides an apparatus. The apparatus includes a receiver, a processor and a transmitter. The receiver receives a first signal for indicating a parameter of K1, and a second signal for indicating a parameter of K2. Wherein K1 is a quantity of transport blocks (TBs) in a downlink association set; and K2 is a quantity of hybrid automatic repeat request acknowledgement (HARQ-ACK) bit fields in a HARQ-ACK codebook. The processor determines a size of the HARQ-ACK codebook based on the first signal and the second signal. The transmitter transmits the HARQ-ACK codebook, wherein the HARQ-ACK codebook comprises a first part including K1 HARQ-ACK bits and a second part including K2 HARQ-ACK bit fields, wherein each bit in the first part corresponds to one TB in the downlink association set; and each HARQ-ACK bit field in the second part corresponds to one incorrectly decoded TB in the downlink association set.

Yet another embodiment of the present application also provides a method. The method includes transmitting a first signal for indicating a parameter of K1, and a second signal for indicating a parameter of K2, and receiving a hybrid automatic repeat request acknowledgement (HARQ-ACK) codebook. Wherein K1 is a quantity of transport blocks (TBs) in a downlink association set; and K2 is a quantity of HARQ-ACK bit fields in the HARQ-ACK codebook. The HARQ-ACK codebook includes a first part including K1 HARQ-ACK bits and a second part including K2 HARQ-ACK bit fields, wherein each bit in the first part corresponds to one TB in the downlink association set; and each HARQ-ACK bit field in the second part corresponds to one incorrectly decoded TB in the downlink association set.

A further embodiment of the present application also provides an apparatus. The apparatus includes a transmitter and a receiver. The transmitter transmits a first signal for indicating a parameter of K1 and a second signal for indicating a parameter of K2. Wherein K1 is a quantity of transport blocks (TBs) in a downlink association set; and K2 is a quantity of hybrid automatic repeat request acknowledgement (HARQ-ACK) bit fields in a HARQ-ACK codebook. The receiver receives the HARQ-ACK codebook, wherein the HARQ-ACK codebook comprises a first part including K1 HARQ-ACK bits and a second part including K2 HARQ-ACK bit fields, wherein each bit in the first part corresponds to one TB in the downlink association set; and each HARQ-ACK bit field in the second part corresponds to one incorrectly decoded TB in the downlink association set.

Embodiments of the present application can reduce signaling overhead for a HARQ-ACK codebook and avoid misunderstanding between a base unit and a remote unit when determining the HARQ-ACK codebook.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only example embodiments of the present application and are not therefore to be considered as limiting of its scope.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments of the present application provide methods and apparatuses for HARQ-ACK codebook determination. To facilitate understanding, embodiments of the present application are provided under specific network architecture and new service scenarios, such as 3GPP 5G NR, 3GPP LTE (Long Term Evolution) Release 8 and onwards. Persons skilled in the art are well-aware that, with developments of network architecture and new service scenarios, the embodiments in the subject disclosure are also applicable to similar technical problems.

Figure 1:
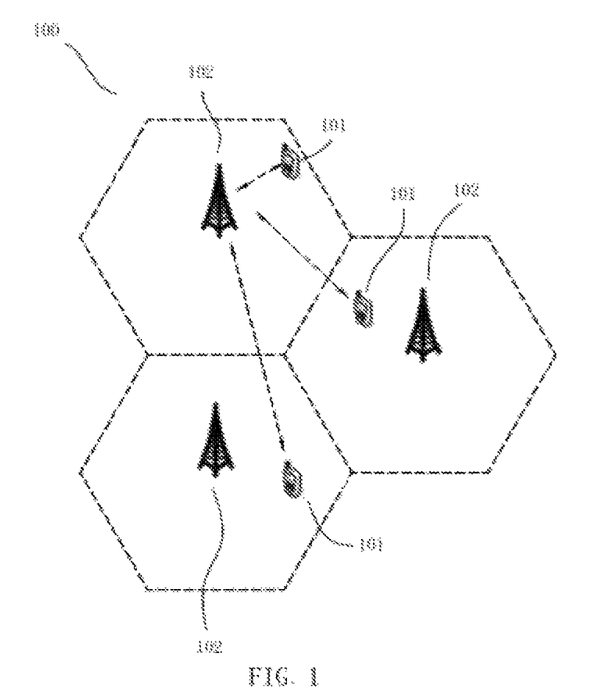
FIG. 1 illustrates an example block diagram of a wireless communication system according to an embodiment of the present application.

FIG. 1 illustrates an example block diagram of a wireless communication system according to an embodiment of the present application.

As shown in FIG. 1, the wireless communication system 100 includes remote units 101 and base units 102. Even though a specific number of remote units 101 and base units 102 are depicted in FIG. 1, one of skill in the art will recognize that any number of remote units 101 and base units 102 may be included in the wireless communication system 100.

The remote units 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present application, the remote units 101 may include a portable wireless communication device, a smart phone, a cellular telephone, a flip phone, a device having a subscriber identity module, a personal computer, a selective call receiver, or any other device that is capable of sending and receiving communication signals on a wireless network. In an embodiment, the remote units 101 include wearable devices, such as smart watches, fitness bands, optical head-mounted displays, or the like. Moreover, the remote units 101 may be referred to as subscriber units, mobiles, mobile stations, users, terminals, mobile terminals, wireless terminals, fixed terminals, subscriber stations, UE, user terminals, a device, or by other terminology used in the art. The remote units 101 may communicate directly with a base unit 102 via uplink (UL) communication signals.

The base units 102 may be distributed over a geographic region. In certain embodiments, a base unit 102 may also be referred to as an access point, an access terminal, a base, a base station, a macro cell, a Node-B, an enhanced Node B (eNB), a gNB, a Home Node-B, a relay node, a device, or by any other terminology used in the art. The base units 102 are generally part of a radio access network that may include one or more controllers communicably coupled to one or more corresponding base units 102.

The base units 102 are generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more base units 102 may be communicably coupled to a mobility management entity (MME), a serving gateway (SGW), and/or a packet data network gateway (PGW).

The base units 102 may serve a number of remote units 101 within a serving area, for example, a cell or a cell sector via a wireless communication link. The base units 102 may communicate directly with one or more of the remote units 101 via communication signals. For example, a base unit 102 may serve remote units 101 within a macro cell.

The base units 102 transmits downlink (DL) communication signals to serve the remote units 101 in the time, frequency, and/or spatial domain. Furthermore, the DL communication signals may be carried over wireless communication links. The wireless communication links may be any suitable carrier in licensed or unlicensed radio spectrum. The wireless communication links facilitate communication between the remote units 101 and the base units 102.

The wireless communication system 100 is compliant with any type of network that is capable of sending and receiving wireless communication signals. For example, the wireless communication system 100 is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, 3GPP 5G network, a satellite communications network, a high altitude platform network, and/or other communications networks.

In one implementation, the wireless communication system 100 is compliant with the long-term evolution (LTE) of the 3GPP protocol, wherein the base unit 102 transmits using an orthogonal frequency division multiplexing (OFDM) modulation scheme on the DL and the remote units 101 transmit on the UL using a single-carrier frequency division multiple access (SC-FDMA) scheme or OFDM scheme. More generally, however, the wireless communication system 100 may implement some other open or proprietary communication protocol, for example, WiMAX, among other protocols.

In other embodiments, the base unit 102 may communicate using other communication protocols, such as the IEEE 802.11 family of wireless communication protocols. Further, in an embodiment, the base unit 102 may communicate over licensed spectrum, while in other embodiments the base unit 102 may communicate over unlicensed spectrum. The present disclosure is not intended to be limited to the implementation of any particular wireless communication system architecture or protocol. In another embodiment, the base unit 102 may communicate with remote units 101 using the 3GPP 5G protocols.

According to an embodiment of the present application, downlink (DL) transport blocks (TBs) are carried on the Physical Downlink Shared Channel (PDSCH). The HARQ-ACK feedback bits corresponding to the PDSCH are transmitted either on the Physical Uplink Control Channel (PUCCH) or on the Physical Uplink Shared Channel (PUSCH). A maximum of two TBs can be transmitted in one PDSCH in one serving cell and in one slot. One TB includes a plurality of code blocks, several code blocks in a TB are grouped into one code block group (CBG), and each code block within a code block group is independently decodable. That is, a TB includes a plurality of CBGs. The number of code blocks within one CBG, i.e., CBG size, varies according to the TB size. The maximum number of CBGs per TB is configured by Radio Resource Control (RRC) signaling. Furthermore, in single codeword (CW) configuration, the maximum configurable number of CBGs per TB is 8, the possible max number of CBGs per TB is 2, 4, 6, or 8; and in multiple CW configuration, the maximum configurable number of CBGs per TB is 4 and the configured maximum number of CBGs per TB is the same between TBs.

Based on the number of CBGs, a wireless communication device can generate a single bit for each CBG then concatenate the generated bits in one HARQ-ACK codebook. That is, one HARQ-ACK bit corresponds to one CBG, and the number of resulting HARQ-ACK bits for one TB may be equal to the number of code block groups. That will balance the quantity of the needed HARQ-ACK feedback bits and the retransmission efficiency. This manner may be called CBG-based HARQ-ACK feedback or CBG-level HARQ-ACK feedback.

When all the code blocks within one CBG are correctly decoded, the HARQ-ACK for the CBG is set to "ACK." Otherwise, it is set to "NACK." Upon the reception of the HARQ-ACK feedback, the CBG(s) with "NACK" shall be retransmitted by the transmitter. Meanwhile, the remote unit, for example, a UE, will combine the received retransmitted CBG(s) with the previously incorrectly decoded CBG(s) for further decoding. Hence, the base unit (for example, a base station (BS)) and the remote unit could have the same understanding on CBG construction, CBG indication, number of HARQ-ACK feedback bits as well as the mapping relationship between one HARQ-ACK bit and one CBG. In order to avoid any misunderstanding, the base unit and the remote unit should synchronize the knowledge on the HARQ-ACK codebook in each transmission or retransmission.

According to an embodiment of the present application, when CBG-based HARQ-ACK feedback is extended from one PDSCH to multiple PDSCHs, CBG-based HARQ-ACK feedback corresponding to multiple PDSCHs is transmitted in one PUCCH, and a base unit and a remote unit maintain the same understanding on the size of a HARQ-ACK codebook. To be precise, the HARQ-ACK codebook includes multiple HARQ-ACK bits for multiple CBGs of one TB, one or two TBs in one PDSCH, multiple PDSCHs in time domain and/or in multiple component carriers. For example, when a remote unit receives N PDSCHs and only one TB can be transmitted on one PDSCH in one serving cell and in one slot, the remote unit needs to report HARQ-ACK feedback for the N PDSCHs in uplink control information (UCI). A manner of determining a HARQ-ACK codebook is setting the HARQ-ACK codebook size as a product of N and M (i.e., N*M), where N is a quantity of PDSCHs and M is a configured maximum number of CBGs of one TB via a RRC signaling. Accordingly, when two TBs can be transmitted on one PDSCH in one serving cell and in one slot, the HARQ-ACK codebook size should be set as N*M*2. That is, the HARQ-ACK codebook size can be semi-statically changed by adjusting the configured maximum number of CBGs and/or the number of bundled PDSCHs via a RRC signaling. This HARQ-ACK codebook size determination manner is simple and reliable. Moreover, there is no ambiguity between the base unit and the remote unit on understanding HARQ-ACK codebooks even when some DL transmissions are missed.

According to an additional embodiment of the present application, in this HARQ-ACK codebook determination manner, when some PDSCHs have less CBGs than the configured maximum number of CBGs in one TB, the remote unit pads redundant bits, for example, "NACK," to make the HARQ-ACK codebook size equal to the predetermined value of N*M or N*M*2 and guarantee the same understanding on each HARQ-ACK bit. For example, in the case that N=4 and M=8, then 32 bits are needed when only one TB can be transmitted on one PDSCH in one serving cell and in one slot, and 64 bits are needed when two TBs can be transmitted on one PDSCH in one serving cell and in one slot. In this case, only one or two CBGs of one TB may be scheduled for transmission, or only one TB is actually transmitted in a transmission mode which configures a maximum of two TBs can be transmitted on one PDSCH in one serving cell and in one slot. That is, this HARQ-ACK codebook determination manner may require Polar coding to encode the HARQ-ACK bits and need more uplink resources for the PUCCH transmission.

According to a further embodiment of the present application, another HARQ-ACK codebook determination manner can bring less signaling overhead and requires less uplink resources for PUCCH transmission. This HARQ-ACK codebook determination manner uses counter downlink assignment index (DAI) and total DAI specified in LTE Rel-13 eCA (enhanced Carrier Aggregation). Counter DAI denotes the accumulative number of carriers and slots in which a downlink transmission is present, up to the present carrier and present slot. The accumulative number firstly increases in order of carrier index and secondly increases in order of slot index within a downlink association set. Total DAI denotes the total number of downlink transmissions up to a present slot within the downlink association set and shall be updated from slot to slot. Generally, a remote unit assumes the same value of total DAI in all downlink transmissions in a slot. A downlink association set includes one or multiple slots or mini-slots in time domain and one or multiple carriers in carrier domain. The HARQ-ACK codebook for the downlink association set corresponds to all downlink transmissions in the downlink association set and each bit in the HARQ-ACK codebook may be ordered based on the counter DA. In another example, the downlink association set may include only slots or only mini-slots. Mini-slot (a.k.a. non-slot) is defined in NR with minimum 1 to maximum 13 symbols and can start at any OFDM symbol within a slot, wherein each slot in NR has 14 OFDM symbols.

According to this HARQ-ACK codebook determination manner, with the help of counter DAI and total DAI, the remote unit can know which DL transmission, for example, PDSCH is missed. Then, the remote unit needs to know how many CBGs of this missed PDSCH has and how many "NACK" bits should be mapped in the HARQ-ACK codebook corresponding to the missed PDSCH.

According to an embodiment of the present application, one solution in this HARQ-ACK codebook determination manner may increase the range of DAI in downlink control information (DCI) to avoid ambiguity between the base unit and the remote unit. For example, in the case that the maximum of CBGs, 8 CBGs are configured per TB, the quantity of HARQ-ACK bits corresponding to each TB can vary from 1 to 8 bits. In the case that DAI in DCI is designed to handle up to 2 back-to-back missing DL assignments (for example, PDSCHs or PDCCH), the number of states that DAI needs to support is 8*(2+1)=24 states, i.e., 5 bits are needed for indicating CBG-domain DAI (which may also be called CBG-based DAI or CBG-level DAI) in DCI. If introducing both counter DAI and total DAI in DCI, then 10 bits are needed in each DL assignment within one downlink association set. Furthermore, combining this HARQ-ACK codebook determination manner based on DAI and total DAI with the abovementioned HARQ-ACK codebook determination manner based on the configured maximum number of CBGs for HARQ-ACK bits per TB, then only two-bit DAI in DCI is needed. Thus, 3 bits are saved in DCI. Introducing both counter DAI and total DAI in DCI can save 6 bits in DCI.

According an embodiment of the present application, a further manner of determining the HARQ-ACK codebook for CBG-based HARQ-ACK feedback retransmission may only report one ACK for one TB when all CBGs in this TB are successfully decoded (i.e., this TB is successfully decoded) at the remote unit. In details, in the case that the maximum number of CBGs per TB is M, the further determination manner does not report M ACKs corresponding to one TB in a HARQ-ACK codebook when this TB is successfully decoded at the remote unit. Instead, it may only report one ACK for this TB in the HARQ-ACK codebook. For a TB unsuccessfully decoded at the remote unit, this further determination manner may report the CBG-based HARQ-ACK for the TB in the HARQ-ACK codebook. In this way, the base unit will know the decoding results in CBG-level at the remote unit, so as to retransmit the incorrectly decoded CBG(s). Meanwhile this HARQ-ACK codebook determination manner is very economical in overhead. Generally, the block error ratio (BLER) for one TB may be about 10%, and the quantity of incorrectly decoded TBs within one downlink association set may be relatively low. Only reporting CBG HARQ-ACK bits for the incorrectly decoded TB(s) may significantly save overhead when the maximum number of CBGs per TB is configured to be 6 or 8 s. Moreover, the above embodiments according to the present application can avoid misunderstanding on HARQ-ACK codebook, especially, the size of the HARQ-ACK codebook between a base unit and a remote unit.

In one embodiment of the present application, a HARQ-ACK codebook may include two parts, wherein a first part includes K1 HARQ-ACK bits and a second part includes K2 HARQ-ACK bit fields, wherein K1 is a quantity of TBs in a downlink association set, and K2 is a quantity of HARQ-ACK bit fields in a HARQ-ACK codebook. Each bit in the first part corresponds to one TB in the downlink association set, and each HARQ-ACK bit field in the second part corresponds to one incorrectly decoded TB in the downlink association set. The first part may be called TB-based HARQ-ACK feedback or TB-level HARQ-ACK feedback, and the second part may be called CBG-based HARQ-ACK feedback or CBG-level HARQ-ACK feedback.

Figure 2A:
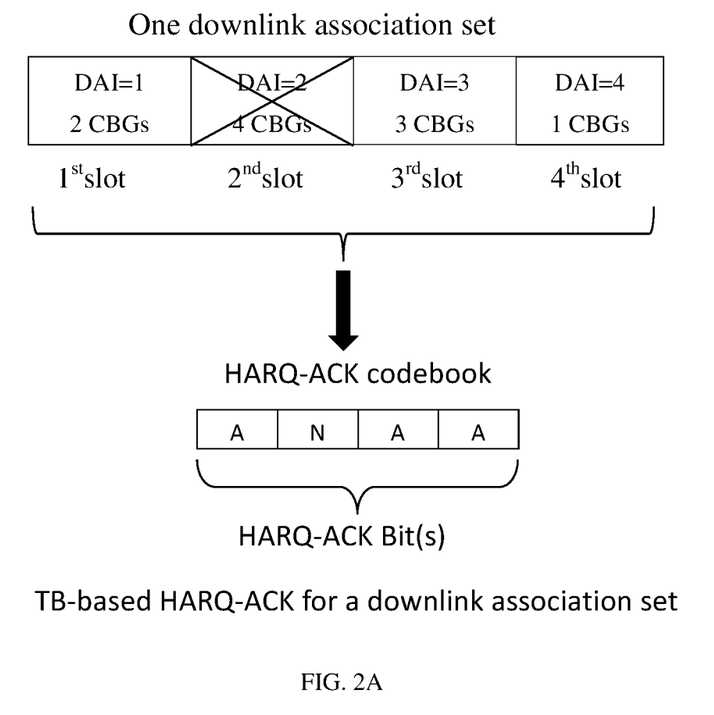
FIG. 2A illustrates an example of a downlink association set according to an embodiment of the present application.

FIG. 2A illustrates an example of a downlink association set according to an embodiment of the present application. In the case that four slots (PDSCHs) form a downlink association set, as shown in FIG. 2A of the present application, the first PDSCH includes four CBGs, the second PDSCH includes two CBGs, the third PDSCH includes three CBGs, and the fourth PDSCH includes one CBG. The HARQ-ACK feedback corresponding to the four PDSCHs within the downlink association set is transmitted in one UCI. When the second PDSCH is lost or missed by the remote unit as shown in FIG. 2A, the remote unit knows the second PDSCH being lost or missed. Therefore, four HARQ-ACK bits (from the first HARQ-ACK bit to the fourth HARQ-ACK bit) in a HARQ-ACK codebook correspond to four CBGs within the first PDSCH may be determined. However, the remote unit also needs to know how many CBGs within the second PDSCH are lost or missed. Accordingly, the remote unit needs to know how many "NACK" bits should be mapped to the second PDSCH and where the remaining HARQ-ACK bits corresponding to the third and fourth PDSCHs should be placed in the HARQ-ACK codebook. In other words, the base unit and the remote unit need to synchronize the understanding on this information when some PDCCH(s) for scheduling PDSCH(s) are missed.

Figure 2B:
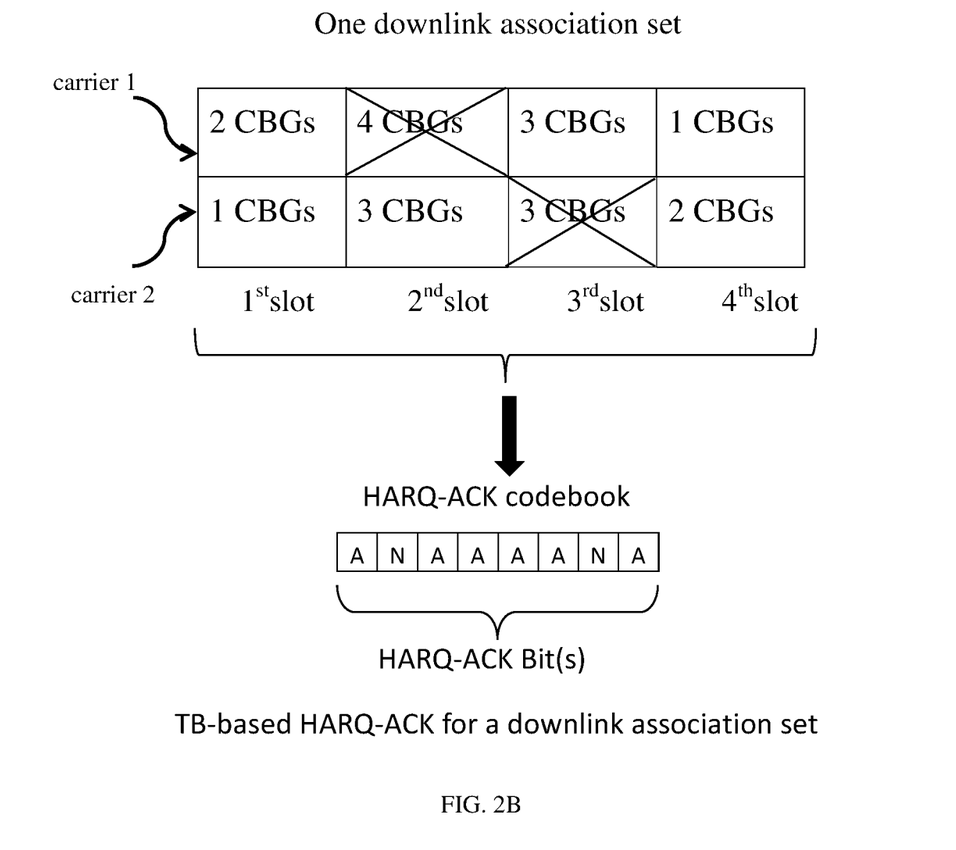
FIG. 2B illustrates an additional example of a downlink association set according to an embodiment of the present application.

FIG. 2B illustrates an additional example of a downlink association set according to an embodiment of the present application. In the case that eight slots (PDSCHs) form a downlink association set, as shown in FIG. 2B of the present application, one downlink association set comprises four slots in time domain and two carriers in carrier domain. Thus there are eight (4*2=8) PDSCHs in this downlink association set. When only one TB can be transmitted on one PDSCH in one serving cell and in one slot, there are eight (4*2=8) TBs in this downlink association set. Accordingly, TB-based HARQ-ACK bits in a HARQ-ACK codebook correspond to TB11 (carrier 1, slot 1), TB12 (carrier 1, slot 2), TB13 (carrier 1, slot 3), TB14 (carrier 1, slot 4), TB21 (carrier 2, slot 1), TB22 (carrier 2, slot 2), TB23 (carrier 2, slot 3), and TB24 (carrier 2, slot 4) within the downlink association set in order, respectively. That is, TB-based HARQ-ACK bits corresponding to the eight TBs within the downlink association set are ordered in the frequency-first time-second rule.

Figure 3:
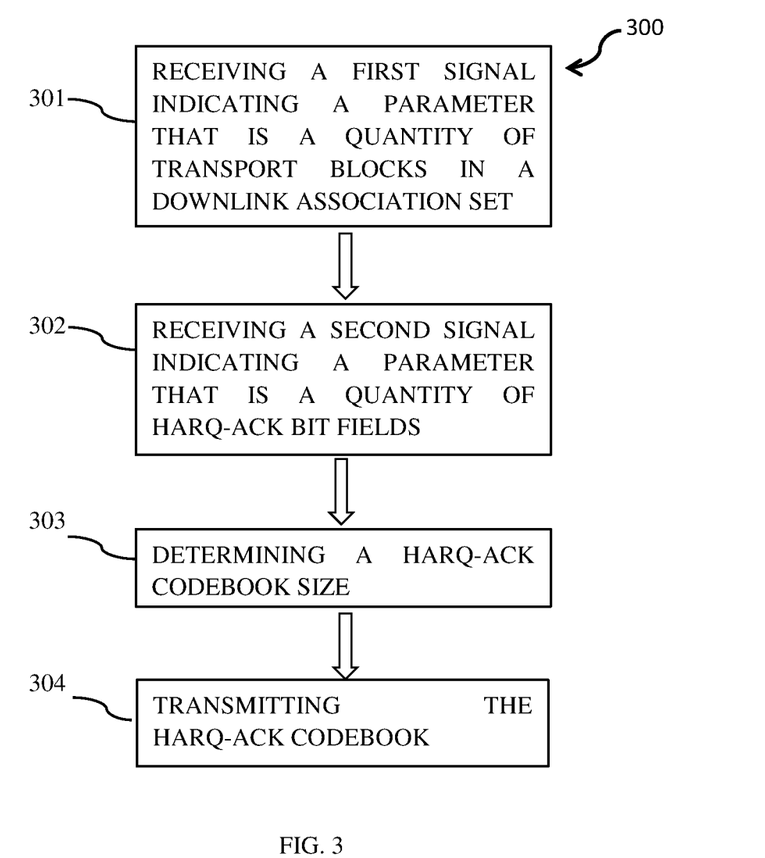
FIG. 3 illustrates an example flowchart demonstrating the operations of a remote unit according to an embodiment of the present application.

FIG. 3 illustrates an example flowchart demonstrating the operations of a remote unit according to an embodiment of the present application. In an embodiment of the present application, the method 300 is performed by an apparatus, such as the remote units 101. In certain embodiments of the present application, the method 300 may be performed by a processor executing program codes, for example, a microcontroller, a microprocessor, a CPU, a GPU, an auxiliary processing unit, a FPGA, or the like.

In step 301 of FIG. 3, a first signal for indicating a first parameter for example, K1, which is an integer, is received from a base unit, wherein the first parameter is a quantity of TBs in a downlink association set. For example, the first signal is a physical layer signaling. In another example, the first signal is a RRC signaling. The first parameter may be used as a payload size of a first part of a HARQ-ACK codebook, which will be illustrated in the following embodiments. The first parameter may be equal to the maximum number of TBs, for example, N, which is an integer, in the downlink association set indicated by the RRC signaling. On the other hand, TB-based HARQ-ACK bits corresponding to the K1 TBs within the downlink association set may be ordered in the frequency-first time-second rule.

Alternatively, the first parameter may be indicated by a total DAI in DCI. In this embodiment, a first part of a HARQ-ACK codebook corresponds to each transmitted DL transmission (for example, PDSCH) within the downlink association set. A remote unit, for example an UE can derive the total DAI indicated in DL assignment as the value of the first parameter K1, and the remote unit can identify the lost or missed DL transmission(s) using additional counter DAI indicated in DL assignment. According to an embodiment of the present application, K1 may be equal to N1, wherein N1 is the value of the total DAI indicated in DL assignment, and N1<=N, wherein N is a maximum number of TBs in the downlink association set. TB-based HARQ-ACK bits corresponding to the K1 TBs within the downlink association set may be ordered in counter DAIs. That is, the TB-based HARQ-ACK bits in the HARQ-ACK codebook for the downlink association set corresponds to all downlink transmissions in the downlink association set and each bit in the TB-based HARQ-ACK bits is ordered based on the counter DAI.

In step 302 of FIG. 3, a second signal for indicating a second parameter, for example, K2 which is an integer is received from a base unit. Wherein the second parameter is a quantity of HARQ-ACK bit fields in a HARQ-ACK codebook. The second signal may be a physical layer signaling or a RRC signaling. The value of the second parameter may be configured by a base unit via RRC signaling. Alternatively, the second parameter may be indicated by a plurality of bits in DCI from a predefined set. In an embodiment of the present application, the number of needed bits for indicating K2 is equal to a result of Equation (1), wherein 0<=K2<=N (i.e., K2=0, 1, 2, . . . , N), and N is a maximum number of TBs in the downlink association set.

$$\text{ceil}(\log 2(N+1)) \quad (1)$$

Alternatively, the second parameter may be selected from a set of values configured by a RRC signaling and indicated by a plurality of bits in DCI. In an embodiment of the present application, the value of K2 is dynamically indicated by a base unit from a RRC configured value set. The number of needed bits for indicating K2 is dependent on the configured value set size. The typical value of the configured value set size may be set to 4, and thus two-bits in DCI are needed for indicating K2. One example for the RRC configured value set may be {0, 1, 2, 4}, and another embodiment for the RRC configured value set may be {1, 2, 3, 4}.

Generally, a HARQ-ACK bit field includes one or more HARQ-ACK bits. For example, each HARQ-ACK bit field in a HARQ-ACK codebook includes M bits for HARQ-ACK feedback, wherein M is an integer. When the second parameter is equal to zero, there is no second part of a HARQ-ACK codebook, and the HARQ-ACK codebook only includes the first part with TB-based HARQ-ACK feedback. Differently, when a remote unit identifies the value of K2 is 0, only TB-based HARQ-ACK feedback in the first part of the HARQ-ACK codebook is transmitted. That implies CBG-based HARQ-ACK feedback is not supported.

In step 303 of FIG. 3, the size of a HARQ-ACK codebook is determined based on the received first and second signals. An example HARQ-ACK codebook may include two parts, and the size of the HARQ-ACK codebook may be determined as a sum of lengths of the two parts. For example, a first part of a HARQ-ACK codebook includes K1 HARQ-ACK bits in TB-level HARQ-ACK feedback and a second part of the HARQ-ACK codebook includes K2 HARQ-ACK bit fields in CBG-level HARQ-ACK feedback, and the size of the HARQ-ACK codebook may be determined as a sum of a bit length of K1 HARQ-ACK bits and a bit length of K2 HARQ-ACK bit fields. The value of K2 may be signaled to the remote unit to avoid any misunderstanding on the final HARQ-ACK codebook between the base unit and the remote unit. That implies the remote unit may only report up to K2 failed TBs with CBG-based HARQ-ACK feedback.

In an additional embodiment, each HARQ-ACK bit field of the second part may include a plurality of HARQ-ACK bits and each of the plurality of HARQ-ACK bits corresponds to one CBG of one incorrectly decoded TB in the downlink association set. For example, a bit length of each HARQ-ACK bit field may be equal to the maximum number of CBGs per TB, for example, M, configured by a RRC signaling. In response to the quantity of HARQ-ACK bits in the first part of the HARQ-ACK codebook is K1, the size of the HARQ-ACK codebook may be K1+M*K2. In response to the quantity of HARQ-ACK bits in the first part, e.g., K1, equal to the maximum number, for example, N of TBs in the downlink association set indicated by the RRC signaling, the size of the HARQ-ACK codebook may be N+M*K2.

For the second part of the HARQ-ACK codebook, CBG-based HARQ-ACK bits corresponding to the incorrectly decoded TBs may be ordered in the rule of frequency-first time-second, which is similar to TB-based HARQ-ACK bits in the first part of the HARQ-ACK codebook.

Figure 5:
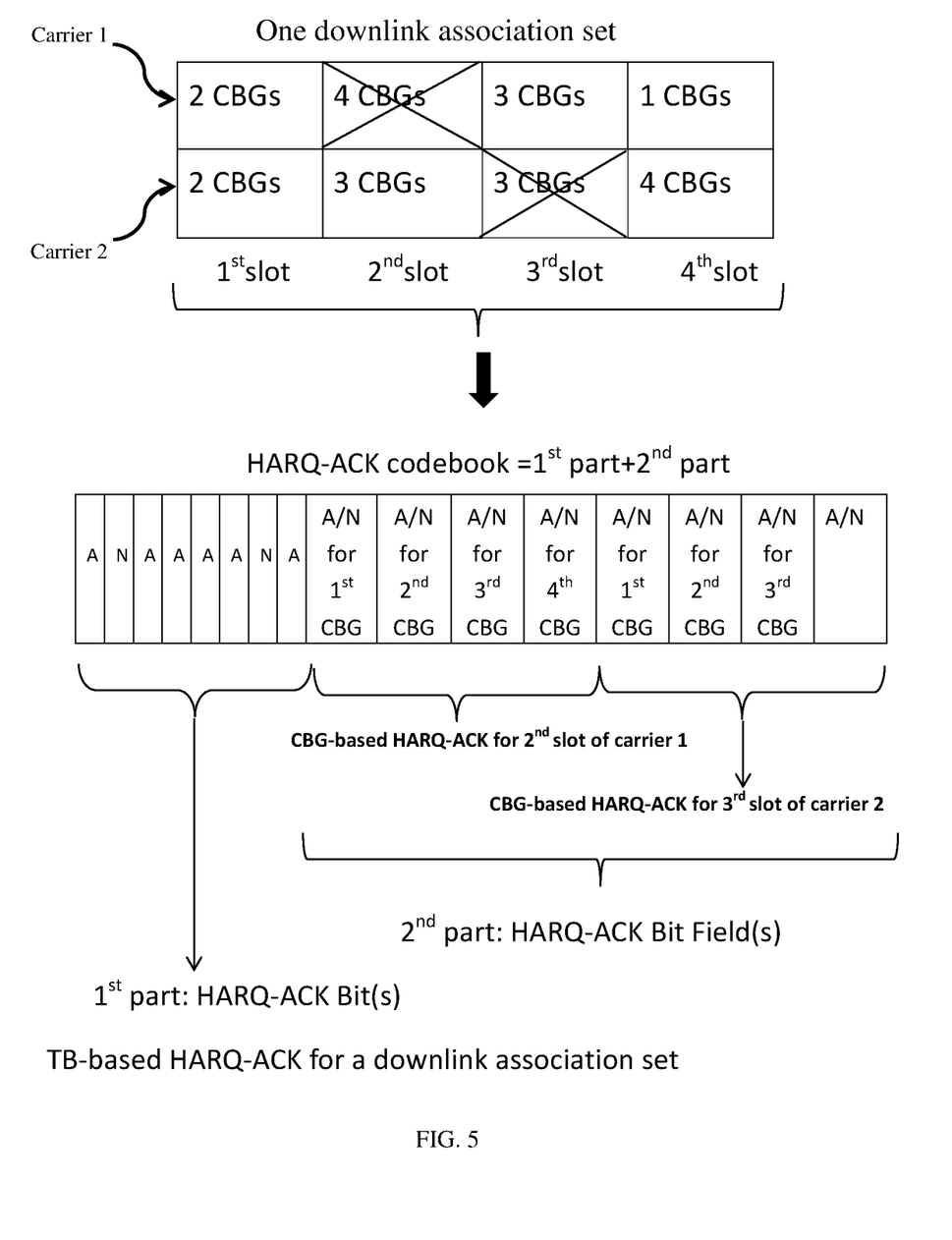
FIG. 5 illustrates an additional example of a HARQ-ACK codebook according to an embodiment of the present application.

In an embodiment of the present application, in response to that K2 is identified to be greater than a quantity of actually incorrectly decoded TBs in the downlink association set at a remote unit, the second part of the HARQ-ACK codebook may be appended with one or more "Acknowledgement (ACK)" or "Negative Acknowledgement (NACK)" bits, to guarantee the payload size of the second part equal to K2*M, wherein M is the RRC configured maximum number of CBGs per TB (referring to the last bit in the HARQ-ACK codebook shown in FIG. 5).

According to an embodiment of the present application, in response to K2 is identified to be smaller than a quantity of the actually incorrectly decoded TBs in the downlink association set at a remote unit, the second part including K2 HARQ-ACK bit fields corresponds to a first K2 TBs (i.e., from the first TB to the K2$^{th}$ TB) or the last K2 TBs (i.e., from the (last-K2+1)$^{th}$ TB to the last TB) of actually incorrectly decoded TBs in the downlink association set. In one embodiment, a remote unit may only report the CBG-based HARQ-ACK feedback corresponding to the first K2 TBs (i.e., from the first TB to the K2 TB) of all the incorrectly decoded TBs, to guarantee the payload size of the second part equal to K2*M, wherein M is the RRC configured maximum number of CBGs per TB. Alternatively, the remote unit may only report CBG-based HARQ-ACK feedback corresponding to the last K2 TBs (i.e., from the (last-K2+1)$^{th}$ TB to the last TB) of all the incorrectly decoded TBs to guarantee the payload size of the second part equal to K2*M, wherein M is the RRC configured maximum number of CBGs per TB. The remaining incorrectly decoded TBs are merely reported as "NACK" in the TB-based HARQ-ACK bits in the first part of the HARQ-ACK codebook, instead of being reported in the second part of the HARQ-ACK codebook. In other words, the remaining incorrectly decoded TBs automatically fall back to TB-level HARQ-ACK feedback, because they are merely feedback in TB-level HARQ-ACK bits, instead of feedback in CBG-level HARQ-ACK bits.

In a further embodiment, in response to K2 is identified to be smaller than a quantity of the actually incorrectly decoded TBs in the downlink association set, in the current UCI transmission, a remote unit only reports CBG-based HARQ-ACK feedback corresponding to the first or last K2 TBs of all the incorrectly decoded TBs to guarantee the payload size of the second part equal to K2*M, wherein M is the RRC configured maximum number of CBGs per TB. The remaining incorrectly decoded TB are reported as "ACK" in the TB-based HARQ-ACK bits of the first part of the HARQ-ACK codebook; and then, in a next UCI transmission, these remaining incorrectly decoded TB are reported as "NACK" in the TB-based HARQ-ACK bits in the first part of the HARQ-ACK codebook with CBG-based HARQ-ACK bits for the "NACK" TBs in the second part of the HARQ-ACK codebook. After receiving both of the current UCI and the next UCI, the base unit may precisely determine which TB and which CBG in TBs are incorrectly decoded at the remote unit.

According to an embodiment of the present application, K2 is indicated based on one or more of an experienced channel condition, a total UCI payload size, a PUCCH format, a required PUCCH resource, an estimated uplink transmit power, K1 and RRC configured maximum number of CBGs per TB and etc.

In step 304 of FIG. 3, the HARQ-ACK codebook is transmitted to the base unit. The first part and the second part of a HARQ-ACK codebook may be transmitted as a whole or may be transmitted separately. According to an embodiment, the first part and the second part of the HARQ-ACK codebook may be transmitted in one UCI. Alternatively, the first part and the second part of the HARQ-ACK codebook may be transmitted in different UCIs.

Figure 4:
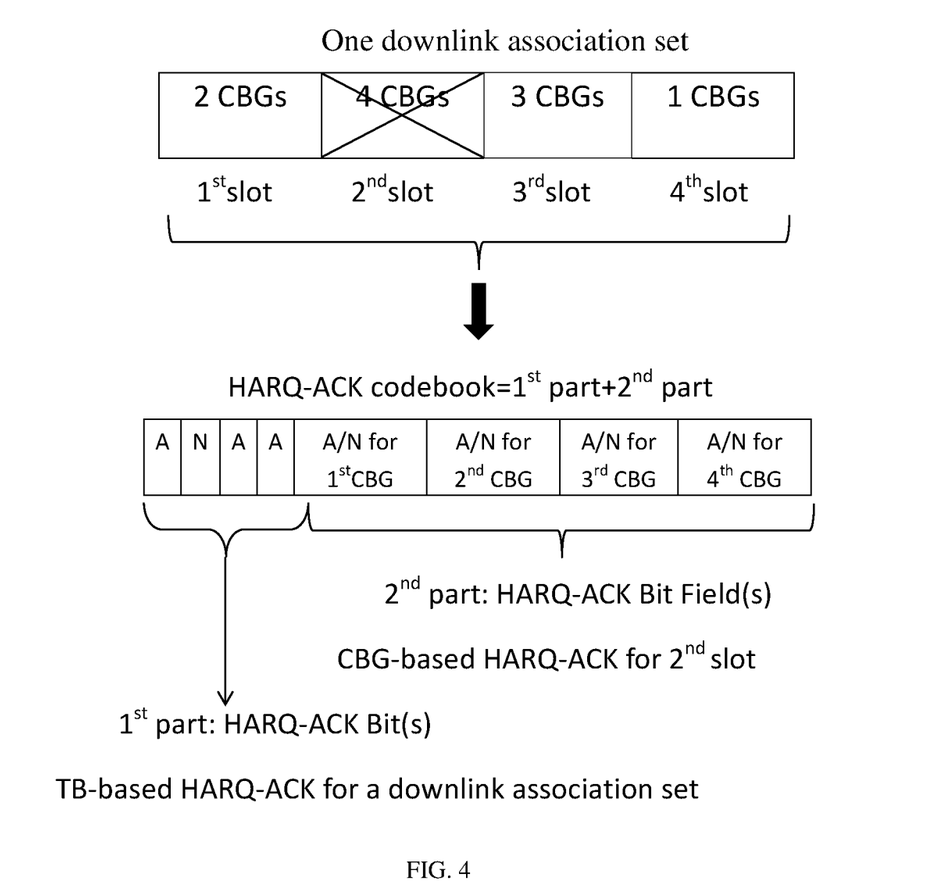
FIG. 4 illustrates an example of a HARQ-ACK codebook according to an embodiment of the present application.

FIG. 4 illustrates an example of a HARQ-ACK codebook according to an embodiment of the present application. In particular, FIG. 4 shows the mapping between four TBs in a downlink association set and bits in the HARQ-ACK codebook. Specifically, the first part of the HARQ-ACK codebook in FIG. 4 has four HARQ-ACK bits, each bit corresponding to one TB in the downlink association set. Since the second TB is incorrectly decoded at a remote unit, a second part of the HARQ-ACK codebook in FIG. 4 has one HARQ-ACK bit field, each bit in the HARQ-ACK bit field corresponding to each CBG of the second TB in the downlink association set. As a result, each bit in the second part of the HARQ-ACK codebook may be set as "ACK" or "NACK" (which is shown as "A/N" in FIG. 4) according to the actual result of CBGs in the second TB in the downlink association set.

For a further example, when a remote unit determines that only the third CBG in the second TB in the downlink association set is incorrectly decoded, then the first, second, and fourth bits in the second part of the HARQ-ACK codebook are set as "ACK," and only the third bit in the second part of the HARQ-ACK codebook are set as "NACK." Accordingly, the HARQ-ACK codebook including the first and second parts definitely and clearly illustrates that the second TB in the downlink association set is incorrectly decoded and meanwhile the third CBG in this second TB is incorrectly decoded. Moreover, this HARQ-ACK codebook determination manner is simple and reliable and such HARQ-ACK codebook is very economical in overhead.

FIG. 5 illustrates an additional example of a HARQ-ACK codebook according to an embodiment of the present application. Specifically, FIG. 5 shows the mapping between eight TBs in a downlink association set and bits in the HARQ-ACK codebook. Specifically, a first part of the HARQ-ACK codebook in FIG. 5 has eight HARQ-ACK bits with each bit corresponding to one TB in the downlink association set. Since the second TB and the seventh TB are incorrectly decoded at a remote unit, a second part of the HARQ-ACK codebook in FIG. 5 has two HARQ-ACK bit fields. Each bit in the first HARQ-ACK bit field corresponds to each CBG of the second TB in the downlink association set, and each bit in the second HARQ-ACK bit field corresponds to each CBG in the seventh TB in the downlink association set. As a result, all bits in the second part of the HARQ-ACK codebook may be set as "ACK" or "NACK" (which is shown as "A/N" in FIG. 5) according to the actual result of CBGs in the second and seventh TBs in the downlink association set. All the above-mentioned implementations or embodiment in a HARQ-ACK codebook are applicable for this embodiment.

Figure 6:
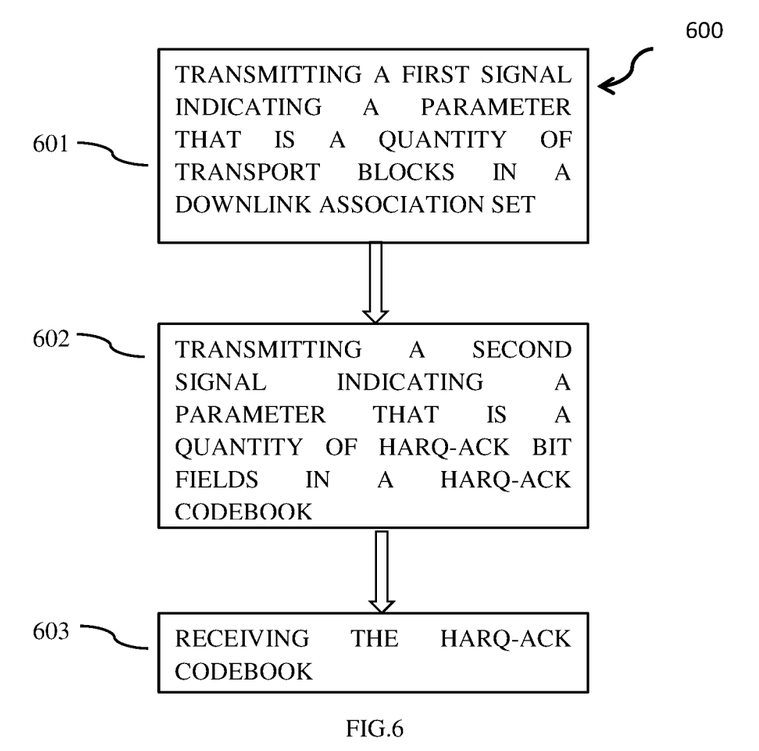
FIG. 6 illustrates an example flowchart demonstrating the operations of a base unit according to an embodiment of the present application.

FIG. 6 illustrates an example flowchart demonstrating the operations of a base unit according to an embodiment of the present application. In an embodiment of the present application, the method 600 is performed by an apparatus, such as the base units 102. In certain embodiments, the method 600 may be performed by a processor executing program codes, for example, a microcontroller, a microprocessor, a CPU, a GPU, an auxiliary processing unit, a FPGA, or the like.

In step 601 of FIG. 6, a first signal for indicating a first parameter, for example, K1 which is an integer, is transmitted to a remote unit. The first parameter is a quantity of TBs in a downlink association set. In step 602 of FIG. 6, a second signal for indicating a second parameter, for example, K2 which is an integer, is transmitted to the remote unit. The second parameter is a quantity of HARQ-ACK bit fields in a HARQ-ACK codebook. In step 603 of FIG. 6, a HARQ-ACK codebook with the determined HARQ-ACK codebook size is received from the remote unit. In one embodiment, the HARQ-ACK codebook may include a first part with K1 HARQ-ACK bits and a second part with K2 HARQ-ACK bit fields. Each bit in the first part corresponds to one TB in the downlink association set. Each HARQ-ACK bit field in the second part corresponds to one of incorrectly decoded TBs in the downlink association set. All the above-mentioned implementations or embodiment in HARQ-ACK codebook determination are applicable for this embodiment.

Figure 7:
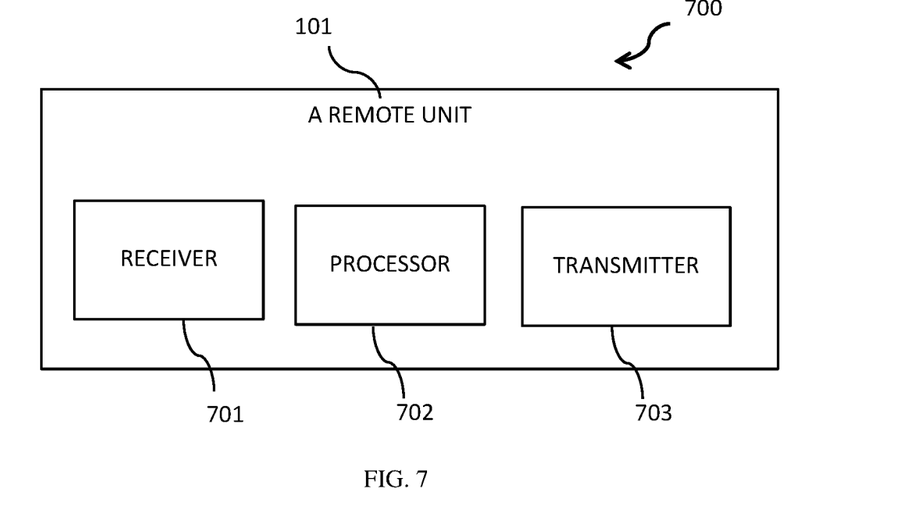
FIG. 7 illustrates an example block diagram of a remote unit according to an embodiment of the present application.

FIG. 7 illustrates an example block diagram of a remote unit according to an embodiment of the present application. The apparatus 700 in FIG. 7 includes one embodiment of the remote unit 101. Furthermore, the remote unit 101 may include a receiver 701, a processor 702, and a transmitter 703. In an embodiment, the receiver 701 and the transmitter 703 may be integrated into a single device, such as a transceiver. In certain embodiments, the remote unit 101 may further include an input device, a display, a memory, and/or other elements. In one embodiment, the receiver 701 receives a first signal for indicating a parameter of K1 and a second signal for indicating a parameter of K2. K1 is a quantity of transport blocks (TBs) in a downlink association set and K2 is a quantity of HARQ-ACK bit fields in a HARQ-ACK codebook received from a base unit 102 (referring to FIG. 8). The processor 702 determines a size of the HARQ-ACK codebook based on the first signal and the second signal. The transmitter 703 transmits the HARQ-ACK codebook to the base unit 102. The HARQ-ACK codebook includes a first part with K1 HARQ-ACK bits and a second part with K2 HARQ-ACK bit fields. Each bit in the first part corresponds to one TB in the downlink association set, and each HARQ-ACK bit field in the second part corresponds to one incorrectly decoded TB in the downlink association set. The functions and implementations of all elements in the apparatus 700 and definitions of related technical terms can refer to the specific descriptions of FIGS. 2-5 and the foregoing corresponding paragraphs in this specification.

Figure 8:
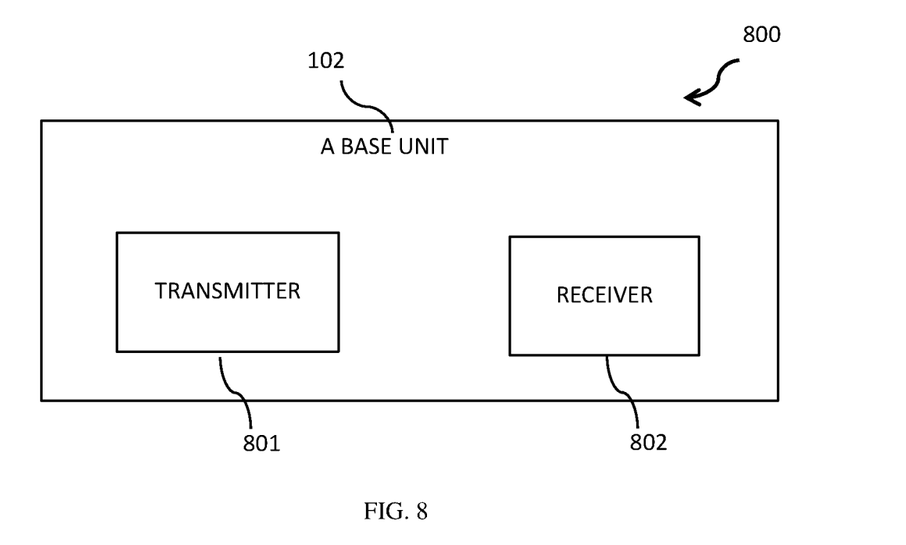
FIG. 8 illustrates an example block diagram of a base unit according to an embodiment of the present application.

FIG. 8 illustrates an example block diagram of a base unit according to an embodiment of the present application. The apparatus 800 in FIG. 8 includes one embodiment of the base unit 102. Furthermore, the base unit 102 may include a transmitter 801 and a receiver 802. In an embodiment, the transmitter 801 and the receiver 803 may be integrated into a single device, such as a transceiver. In certain embodiments, the base unit 102 may further include an input device, a display, a memory, and/or other elements. In one embodiment, a transmitter 801 transmits, to a remote unit, a first signal for indicating a parameter of K1 and a second signal for indicating a parameter of K2. Wherein K1 is a quantity of transport blocks (TBs) in a downlink association set, and K2 is a quantity of HARQ-ACK bit fields in a HARQ-ACK codebook. The receiver 803 receives the HARQ-ACK codebook from the remote unit 101 (referring to FIG. 7). The HARQ-ACK codebook comprises a first part including K1 HARQ-ACK bits and a second part including K2 HARQ-ACK bit fields. Each bit in the first part corresponds to one TB in the downlink association set, and each HARQ-ACK bit field in the second part corresponds to one incorrectly decoded TB in the downlink association set. The apparatus 800 may further include a processor, which is used for determining, indicating, or adjusting K2, i.e., a quantity of HARQ-ACK bit fields in a HARQ-ACK codebook. For example, the processor in the apparatus 800 determines K2 based on one or more of an experienced channel condition, a total UCI payload size, a PUCCH format, a required PUCCH resource, an estimated uplink transmit power, K1 and configured maximum number of CBGs per TB and etc. The functions and implementations of all elements in the apparatus 800 and definitions of related technical terms can refer to the specific descriptions of FIGS. 2 and 4-6 and the foregoing corresponding paragraphs in this specification.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present application by simply employing the elements of the independent claims. Accordingly, the embodiments of the present application as set forth herein are intended to be illustrative, not limiting. Various changes may be made without departing from the spirit and scope of the present application.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The following is what is claimed:

1. An apparatus comprising:
    a receiver that receives a first signal for indicating a parameter of K1, wherein K1 is a quantity of transport blocks in a downlink association set, K1 is also equal to a number of hybrid automatic repeat request bits, K1 is an integer greater than one, and the first signal is received from a network device and indicates K1 as a first integer value; and
    receives a second signal for indicating a parameter of K2, wherein K2 is a quantity of hybrid automatic repeat request acknowledgement bit fields in a hybrid automatic repeat request acknowledgement codebook, and the second signal is received from the network device and indicates K2 as a second integer value;
    a processor that determines, based on the first signal and the second signal, a size of the hybrid automatic repeat request acknowledgement codebook;
    a transmitter that transmits the hybrid automatic repeat request acknowledgement codebook, wherein the hybrid automatic repeat request acknowledgement codebook comprises a first part including the K1 number of hybrid automatic repeat request acknowledgement bits and a second part including K2 hybrid automatic repeat request acknowledgement bit fields, wherein each bit in the first part corresponds to one transport block in the downlink association set, and each hybrid automatic repeat request acknowledgement bit field in the second part corresponds to one incorrectly decoded transport block in the downlink association set.

2. The apparatus of claim 1, wherein the first signal is a physical layer signaling and K1 is indicated by a total Downlink Assignment Index in downlink control information.

3. The apparatus of claim 1, wherein the first signal is a Radio Resource Control signaling and K1 is equal to a maximum number of transport blocks in the downlink association set indicated by the Radio Resource Control signaling.

4. The apparatus of claim 1, wherein each hybrid automatic repeat request acknowledgement bit field in the second part comprises a plurality of hybrid automatic repeat request acknowledgement bits and each of the plurality of hybrid automatic repeat request acknowledgement bits corresponds to one code block group of one incorrectly decoded transport block in the downlink association set.

5. The apparatus of claim 1, wherein a bit length of each hybrid automatic repeat request acknowledgement bit field is equal to a maximum number of code block groups per transport block configured by a Radio Resource Control signaling.

6. The apparatus of claim 1, wherein the second signal is a Radio Resource Control signaling.

7. The apparatus of claim 1, wherein the second signal is a physical layer signaling and K2 is selected from a set of values and indicated by a plurality of bits in downlink control information.

8. The apparatus of claim 1, wherein the second part is appended with "Acknowledgement" or "Negative Acknowledgement" bit in response to K2 is identified greater than a quantity of actually incorrectly decoded transport blocks in the downlink association set.

9. The apparatus of claim 1, wherein the second part including K2 hybrid automatic repeat request acknowledgement bit fields corresponds to a first K2 transport blocks of actually incorrectly decoded transport blocks in the downlink association set in response to K2 is identified smaller than a quantity of the actually incorrectly decoded transport blocks in the downlink association set.

10. A method comprising:
receiving a first signal for indicating a parameter of K1, wherein K1 is a quantity of transport blocks in a downlink association set, K1 is also equal to a number of hybrid automatic repeat request bits, K1 is greater than one, and the first signal is received from a network device and indicates K1 as a first integer value; and
receiving a second signal for indicating a parameter of K2, wherein K2 is a quantity of hybrid automatic repeat request acknowledgement bit fields in a hybrid automatic repeat request acknowledgement codebook, and the second signal is received from the network device and indicates K2 as a second integer value;
determining a size of the hybrid automatic repeat request acknowledgement codebook based on the first signal and the second signal;
transmitting the hybrid automatic repeat request acknowledgement codebook, wherein the hybrid automatic repeat request acknowledgement codebook comprises a first part including the K1 number of hybrid automatic repeat request acknowledgement bits and a second part including K2 hybrid automatic repeat request acknowledgement bit fields, wherein each bit in the first part corresponds to one transport block in the downlink association set, and each hybrid automatic repeat request acknowledgement bit field in the second part corresponds to one incorrectly decoded transport block in the downlink association set.

11. An apparatus comprising:
a transmitter that transmits a first signal for indicating a parameter of K1, wherein K1 is a quantity of transport blocks in a downlink association set, K1 is also equal to a number of hybrid automatic repeat request bits, K1 is greater than one, and the first signal is transmitted from a network device and indicates K1 as a first integer value; and
transmits a second signal for indicating a parameter of K2, wherein K2 is a quantity of hybrid automatic repeat request acknowledgement bit fields in a hybrid automatic repeat request acknowledgement codebook, and the second signal is transmitted from the network device and indicates K2 as a second integer value;
a receiver that receives the hybrid automatic repeat request acknowledgement codebook, wherein the hybrid automatic repeat request acknowledgement codebook comprises a first part including the K1 number of hybrid automatic repeat request acknowledgement bits and a second part including K2 hybrid automatic repeat request acknowledgement bit fields, wherein each bit in the first part corresponds to one transport block in the downlink association set, and each hybrid automatic repeat request acknowledgement bit field in the second part corresponds to one incorrectly decoded transport block in the downlink association set.

12. The apparatus of claim 11, wherein the first signal is a physical layer signaling and K1 is indicated by a total Downlink Assignment Index in downlink control information.

13. The apparatus of claim 11, wherein the first signal is a Radio Resource Control signaling and K1 is equal to a maximum number of transport blocks in the downlink association set indicated by the Radio Resource Control signaling.

14. The apparatus of claim 11, wherein each hybrid automatic repeat request acknowledgement bit field in the second part comprises a plurality of hybrid automatic repeat request acknowledgement bits and each of the plurality of hybrid automatic repeat request acknowledgement bits corresponds to one code block group of one incorrectly decoded transport block in the downlink association set.

15. The apparatus of claim 11, wherein a bit length of each hybrid automatic repeat request acknowledgement bit field is equal to a maximum number of code block groups per transport block configured by a Radio Resource Control signaling.

16. The apparatus of claim 11, wherein the second signal is a Radio Resource Control signaling.

17. The apparatus of claim 11, wherein the second signal is a physical layer signaling and K2 is selected from a set of values and indicated by a plurality of bits in downlink control information.

18. The apparatus of claim 11, wherein K2 is indicated based on at least one of: experienced channel condition, total uplink control information payload size, Physical Uplink Control Channel format, required Physical Uplink Control Channel resource, estimated uplink transmit power, K1, and Radio Resource Control configured maximum number of code block groups per transport block.

19. A method comprising:
transmitting a first signal for indicating a parameter of K1, wherein K1 is a quantity of transport blocks in a downlink association set, K1 is also equal to a number of hybrid automatic repeat request bits, K1 is greater than one, and the first signal is transmitted from a network device and indicates K1 as a first integer value; and
transmitting a second signal for indicating a parameter of K2, wherein K2 is a quantity of hybrid automatic repeat request acknowledgement bit fields in a hybrid automatic repeat request acknowledgement codebook, and the second signal is transmitted from the network device and indicates K2 as a second integer value;
receiving the hybrid automatic repeat request acknowledgement codebook, wherein the hybrid automatic repeat request acknowledgement codebook comprises a first part including the K1 number of hybrid automatic repeat request acknowledgement bits and a second part including K2 hybrid automatic repeat request acknowledgement bit fields, wherein each bit in the first part corresponds to one transport block in the downlink association set, and each hybrid automatic repeat request acknowledgement bit field in the second part corresponds to one incorrectly decoded transport block in the downlink association set.

* * * * *